Aug. 12, 1952    J. L. BARKER    2,606,943
AUTOMATIC RANGE-SHIFTING VOLTMETER
Filed Feb. 6, 1947
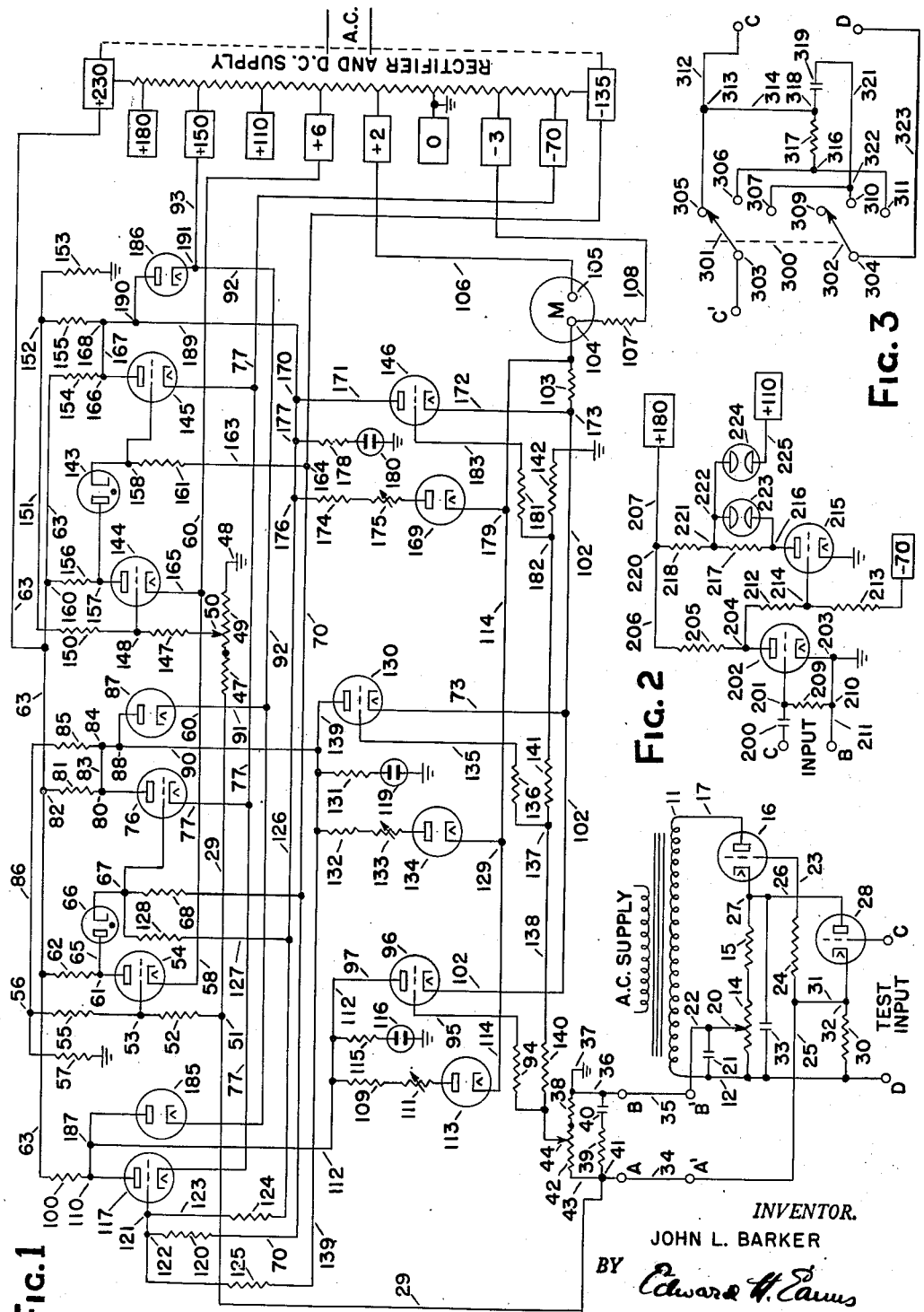
INVENTOR.
JOHN L. BARKER
BY Edward W. Eames
ATTORNEY

UNITED STATES PATENT OFFICE 2,606,943

AUTOMATIC RANGE-SHIFTING VOLTMETER

John L. Barker, Norwalk, Conn., assignor to Eastern Industries, Incorporated, East Norwalk, Conn., a corporation of Delaware Application February 6, 1947, Serial No. 726,826

18 Claims. (Cl. 171—95)

This invention relates to electrical measuring instruments and more particularly to an automatic voltmeter having a self-adjusting range, so that when connected to a voltage to be measured the voltmeter will automatically select the appropriate range to bring the meter indication well within the scale of the meter so as to avoid damage to the meter and to provide increased speed and accuracy in reading the voltage on the meter scale.

This automatic voltmeter according to the invention is preferably of the electronic type to provide substantially immediate automatic selection of the appropriate range upon connection to a test voltage and to permit reading of voltages of sensitive circuits without disturbing the circuit electrically.

It has been a general practice in the past to provide several voltage ranges on a voltmeter for selection by hand by means of a multi-position switch having a rotary operating knob on the face of the voltmeter and a range indicator scale marked in numbers or letters adjacent the knob to indicate the voltage scale for which the meter is adjusted. In many cases the sensitive voltage indicating pointer of the meter swings over a scale plate having several voltage scales marked and the operator must be sure which scale has been selected by the manual selector switch knob in order to read the proper one of the several voltage scales visible under the pointer.

Another well known form of voltmeter having manual range selection is one in which jacks are provided in the meter case for the different voltage ranges and the test leads are plugged into one or another set of the jacks manually to select the range.

With the single range voltmeter and with the manual range selector voltmeter of the past the operator must know in advance the general range of voltage to be measured or must be sure that the voltage to be measured does not exceed the maximum for the range setting before connecting the meter, in order to avoid damage to the meter by excessive voltage. It has been good practice therefore to set manually the range selection for the highest range of the ordinary manual multi-range voltmeter before connecting the meter to test an unknown voltage. Then if the meter shows too low a voltage indication to be read clearly the range selection is shifted to one or another of the lower scales until the appropriate scale is determined. Thus in making a long series of voltage tests of unknown voltages with the manual type multi-range voltmeter, as in the testing and inspection of radio and radar circuits and other electrical apparatus a considerable amount of time of the operator is spent in adjusting the range of the voltmeter.

These difficulties are overcome in the automatic voltmeter according to the invention in which the range selection is immediate and automatic and is preferably indicated by the lighting of one of a group of range indicator lamps so that a simplified voltage scale may be employed and the possibility of human error by reading the wrong scale minimized. The range indication may show the multiplier to be used with the pointer scale or may show which of several ranges visible on the pointer scale is to be used. The invention is applicable to either form of range indication but it is believed that the use of a single scale and multipliers in powers of 10 such as 10 times and 100 times the scale or one tenth of the scale for example offers the greater simplicity.

It is a general object of the invention to provide an improved meter having automatic selection of its indicating range.

It is also an object of the invention to provide an improved multirange meter for measuring electrical values and having a single indicating scale and a plurality of separate indicators and associated appropriate electrical paths providing proper multipliers for the different ranges, and automatic selection of the appropriate electrical path and associated indicator in accordance with the electrical value being measured.

It is a further object of the invention to provide an improved multirange voltmeter having automatic selection of appropriate range in response to the voltage to which the voltmeter is connected for measurement.

It is another object of the invention to provide an improved multirange voltmeter employing electronic selector circuits to provide substantially immediate automatic selection of an appropriate range upon connection of the voltmeter to a voltage to be tested.

It is also an object of the invention to provide an improved voltmeter adapted for measuring A. C. and D. C. voltages and providing automatic selection of the proper indicating range and corresponding adjustment of the meter to indicate and measure the type of voltage being tested by the meter.

It is an additional object of the invention to provide an improved voltmeter having an A. C. voltage range and a D. C. voltage range and providing automatic selection between such ranges in accordance with the voltage to which the meter is connected for test.

Referring now to the drawings:

Fig. 1 shows a schematic circuit diagram of a preferred embodiment of an automatic range selecting voltmeter in accordance with the invention.

Fig. 2 shows an A. C.-D. C. indicator circuit which may be employed with the automatic voltmeter circuit of Fig. 1.

Fig. 3 shows a modification of the circuit of Fig. 1 which may be employed as a switching circuit for separate reading of A. C. and D. C. components of a D. C. biased A. C. voltage.

For measurement testing of voltages on A. C. circuits and D. C. circuits or on circuits on which it is unknown whether the voltage is A. C. or D. C., a completely automatic voltmeter preferably includes both the automatic range selection voltmeter circuit of Fig. 1 and the A. C.-D. C. indicating circuit of Fig. 2, since this combination provides immediate indication of the value of voltage and type (A. C. or D. C.) of voltage automatically, with the meter scale indicating element automatically adjusted to read the A. C. or D. C. voltage properly as needed by the test circuit. However for some applications where the use of the voltmeter is to be limited to one type of voltage alone the circuit of Fig. 1 alone will be sufficient.

Referring now to Fig. 1, the automatic voltmeter circuit according to one embodiment of the invention preferably includes a cathode follower circuit for the test input and a group of range circuits for the respective desired voltage ranges of the meter and a range selection or switching circuit group for switching between such ranges responsive to the test input voltage. The input cathode follower is shown in the lower left part of Fig. 1 between test input terminals C and D and the terminals A' and B' which are the output terminals of this cathode follower. The output of this cathode follower at terminals A' and B' is connected via wires 34 and 35 to the input terminals A and B of the range circuits and range switching circuits.

For limited or particular applications of an automatic voltmeter for use in testing D. C. circuits on which a small degree of current drain by the meter circuit is not objectionable for example the input cathode follower circuit may be omitted and the circuit to be tested may be connected directly across terminals A and B. For general use however it is preferable for an input cathode follower circuit to be included as shown.

In the preferred embodiment of the invention in Fig. 1 there are three ranges for the voltmeter—low, medium and high—and these ranges are provided by three cathode follower range or range setting circuits for the meter M on which the voltage readings are obtained, and two range switching circuits are provided for switching between the low and medium ranges and between the medium and high ranges respectively.

The meter M is shown at the lower right of Fig. 1, the three range circuits based on the cathode follower tubes 96, 130 and 146 for low, medium and high ranges respectively are shown in a row across the middle of Fig. 1, and the range switching circuits based on the control tubes 54 and 144 are shown in a row across the upper part of Fig. 1. Also in this upper row appear the three control tubes 117, 76 and 145 which serve to render the respective low, medium and high range circuits effective and ineffective in connection with the control tubes 54 and 144 in switching from one range circuit to another so that only one range circuit is effective at any one time to serve the meter M.

It will be appreciated that these several circuits or circuit groups or parts are combined into one interconnected whole circuit in the automatic voltmeter as shown in Fig. 1 and that the circuit groupings mentioned above are primarily for convenience of reference and identification in considering the interrelation of the various parts of the circuit broadly. At the right side of Fig. 1 is shown schematically the A. C. power supply leads marked A. C. and the rectifier and D. C. power supply block connected with this A. C. on its right side and providing at its left side the several D. C. output voltages for the voltmeter circuit as indicated by the plus and minus numbers in small blocks at tapping points on the potentiometer extending between +230 and −135.

Ordinarily the same A. C. power supply will be employed for the input cathode follower as marked "A. C. Supply" in the lower left of Fig. 1, and the automatic voltmeter will ordinarily be connected to the A. C. power supply a short time before starting voltage testing to allow for the usual warming up time of the tube heaters. The voltage to be tested is connected across the "Test Input" terminals C and D and the input cathode follower supplies a corresponding D. C. voltage between terminals A and B for a D. C. voltage input or a D. C. voltage corresponding to the R. M. S. value of the input voltage in case of A. C. input.

The meter M may be of the milliameter element type for example with a single scale, which may preferably be of the logarithmic type although it need not be limited to this type. With such a single scale the reading of the scale under the pointer of the meter element is multiplied by a factor as automatically selected and indicated by the range switching circuits and range circuits and corresponding range indicator lamps of the Fig. 1 circuit as will be more fully described below. A convenient range grouping may be 0 to 5 volts for the low range, 5 to 50 for the medium range and 50 to 500 for the high range with scale multiplying factors of 1, 10 and 100 respectively against a scale reading from 0 to 5 for example, although it will be understood that the automatic voltmeter is not limited to such ranges and other suitable ranges may be employed.

Considering now the circuit of Fig. 1 in more detail the A. C. supply for the input cathode follower is connected to the input of a transformer, and the left side of the output 11 of this transformer is connected via wire 12 to terminal D.

The other side of the output 11 is connected to the anode of the triode rectifier tube 16 via wire 17. Potentiometer 14 and resistor 15 are connected in series between wire 12 and the cathode of tube 16. The arm 20 of potentiometer 14 is connected via capacitor 21 to wire 12 and is connected via wire 22 to terminal B'. The grid of tube 16 is connected via wire 23, very high resistance 24 and wire 25 to terminal A'.

The cathode follower triode 28 has its grid connected to input terminal C and its anode connected via wire 26 to the cathode of tube 16 at junction 27. The cathode of triode 28 is connected via very high resistance 30 to wire 12 which is connected to input terminal D. The wire 25 is also connected to the cathode of tube 28 via wire 31 at junction 32. Capacitor 33 is connected between wires 12 and 26.

Terminals A¹ and B¹ are connected to terminals A and B respectively via wires 34 and 35 respectively. Very high resistance 39 and capacitor 40 are connected in series across terminals A and B at wires 43 and 36 respectively. A very high resistance potentiometer 42 is connected in series with a fixed resistance 39 also across the input terminals A and B via wires 43 and 36 respectively, and terminal B and wire 36 are connected to ground at 37. From terminal A and wire 43 at junction 41 a connection is made via wire 29 and junction 51 high resistance 47 and potentiometer 49 to ground at 48, the junction 51 ad the arm 50 of potentiometer 49 provide connections via resistance 52 and 147 respectively to the control grids of the control triode tubes 54 and 144 in the range switching circuit group near the top of Fig. 1.

The arm 44 of potentiometer 42 provides connection to the range circuit group in the middle of Fig. 1. A circuit is connected from arm 44 via resistor 140, wire 138, junction 137, resistor 141, junction 182, and resistor 142 to ground, and a connection to the grid of the low range cathode follower tube 96 is made from arm 44 via resistor 94 and wire 95 to this grid. Similarly from juction 137 between resistors 140 and 141 a connection is made via resistor 136 and wire 135 to the control grid of the medium range cathode follower tube 130, and a connection is made from junction 182 between resistors 141 and 142 via resistor 181 wire 183 to the control grid of high range cathode follower tube 146.

The cathodes of the last mentioned three cathode follower tubes are connected together at wire 102 and via junction 173 and resistor 103 to one terminal 104 of the meter M which is also connected via resistor 107 and wire 108 to —3 volts on the power supply. The other terminal 105 of the meter M is connected via wire 106 to +2 on the power supply.

The cathode follower for each range has associated with it a range adjusting circuit and a range indicator lamp. The range adjusting circuit for the low range cathode follower 96 includes resistor 109 variable resistor 111 and the diode 113 connected in series and connected between the anode of tube 96 at 97 via wire 112, resistor 109, resistor 111, tube 113, wire 114, junctions 129 and 179 to terminal 104 of meter M. Resistor 115 and low range indicator lamp 116 are connected in series between wire 112 and ground.

The range adjusting circuit for the medium range includes resistor 132 adjustable resistor 133 and diode 134 connected between the anode of the cathode follower tube 130 for the medium range at wire 139 and junction 129. The medium range indicator lamp 119 and resistor 131 are connected in series between wire 139 and ground.

In the high range circuit group the range adjusting circuit connects with the anode of the cathode follower tube 146 and wire 171 via junction 170, junction 177, and junction 176, resistor 174, adjustable resistor 175, diode 169, and junction 179 on wire 114. The cathodes of the three diodes 113, 134, and 169 are connected together at wire 114, the anodes of these diodes being connected to their respective associated resistors above these diodes. The high range indicator lamp 180 is connected in series with resistor 178 between junction 177 and ground.

Each range cathode follower has its anode connected to the anode of a corresponding control tube in the switch circuit group along the upper part of Fig. 1. Thus the anode of cathode follower 96 is connected via wire 97, wire 112 and junction 187 to the anode of the triode 117 at junction 118. Similarly the anode of the medium range cathode follower 130 is connected via wire 139, wire 90, junction 88, junction 84, wire 83 to the anode of the triode 76 at junction 80, and the anode of the high range cathode follower 146 is connected via wire 171, junction 170, junction 190, junction 168, wire 167 to the anode of the triode 145 at junction 166.

The cathodes of tubes 117, 76 and 145 are connected together at wire 77 and to —70 on the power supply. The anodes of the triodes 117, 76 and 145 are also connected to the anodes of diodes 185, 87 and 186 respectively and through these diodes to +150 on the power supply via wires 92 and 93.

The +230 terminal of the D. C. power supply is connected via wire 63 and resistor 100 to the anode of triode 117 and from wire 63 via resistor 81 to the anode of triode 76, and from wire 63 via resistor 154 to the anode of triode 145.

The control grid of triode 117 is connected via junction 121, wire 123, resistor 124, wire 126, junctions 176, 177 and 170 and via wire 171 to the anode of the high range cathode follower 146. A further circuit connects the grid of triode 117 via junctions 121, 122, resistor 125 and wire 139 to the anode of medium range cathode follower 130. Another circuit connects the grid of triode 117 via junctions 121, 122, resistor 120 and wire 70 to —135 on the power supply.

The control grid of triode 76 is connected via junction 67, resistor 128, wires 127 and 126 and junctions 176, 177 and 170 and wire 171 to the anode of the high range cathode follower 146. The grid of triode 76 is also connected via junction 67 and resistor 68 and wire 70 to —135 on the power supply, and the grid of triode 145 at junction 158 is also connected to —135 on the power supply via wire 163, resistor 161 and junction 164 on wire 70.

The low-medium range switching control triode 54 has its control grid at 53 connected via resistor 52 to terminal A as previously described and this control grid is also connected via resistor 55, junction 56 and resistor 57 to ground. The gas discharge tube 66 is connected between the anode of triode 54 at junction 61 and the control grid of triode 76 at junction 67.

The medium-high range switching control triode 144 has its control grid at 148 connected via resistor 147 to potentiometer arm 50 of potentiometer 49, which is connected in series with resistor 47 between terminal A and ground. The gas discharge tube 143 is connected between the anode of triode 144 at junction 157 and the control grid of triode 145 at junction 158.

The anodes of triodes 54 and 144 are connected via resistors 62 and 156 respectively to wire 63 and +230 on the power supply.

The control grid of triode 144 is also connected via resistor 150, wire 151, junction 152 and resistor 153 to ground, and resistor 155 is connected from junction 152 via junction 168, wire 167, to the anode of triode 145 at junction 166. A resistor 85 is connected from the anode of triode 76 at junction 80 via wire 83, junction 84, resistor 85, wire 86 to junction 56 between resistors 55 and 57.

The cathodes of triodes 54 and 144 are connected via wires 58 and 60 and via wires 165 and 60 respectively to +6 on the power supply.

Considering now the operation of the automatic voltmeter circuit of Fig. 1, it will be assumed for purpose of illustration that the low, medium and high ranges 0 to 5, 5 to 50, and 50 to 500 approximately are employed in the automatic voltmeter, and that 2 volts D. C. or A. C. is being applied to the input terminals C and D of the input cathode follower, in which case the output of the cathode follower applied to the terminals A and B would be approximately 2 volts D. C. regardless of whether D. C. or A. C. was applied to terminals C and D. In this connection it should be understood that the output voltage is described as approximately 2 volts since there will be a light loss in voltage through the cathode follower, but this loss is proportionate to the input voltage and therefore can be taken in account in calibration of the meter, since the output voltage of the cathode follower will be proportionate to its input voltage. Similarly there is a slight voltage drop in whichever range cathode follower is effective in the meter circuit, and there will also be a further voltage loss to the extent that the arm 44 is set on potentiometer 42 for less than the full voltage value between terminals A and B. These losses are considered in calibrating the meter M in connection with the potentiometer 42 which gives a means of overall calibration of the automatic voltmeter so that the meter on any range will read accurately the same value as the test input voltage value.

The approximate 2 volts D. C. input across terminals A and B also appears across potentiometer 42 and resistor 38 in series via wires 43 and 36. Resistor 39 and capacitor 40 are connected in series across this input to filter any A. C. ripple remaining in case of A. C. input voltage.

The arm 44 is ordinarily set to obtain a large part of the input voltage and it will be assumed for example that 1.8 volts is taken off at arm 44 in the case of the assumed 2 volts input.

This 1.8 volts between arm 44 and ground is applied across the series resistors 140, 141 and 142 connected between arm 44 and ground and forming a voltage divider for applying a desired proportion of the total voltage to the different range cathode followers.

The total input voltage at A and B is also applied from A via wire 29 across resistor 47 and potentiometer 49 in series connected to ground at 48. Portions of the input voltage are applied from wire 29 at junction 51 and from arm 50 of potentiometer 49 to the control grids of the range switching control triodes 54 and 144 respectively to control the switching in accordance with the input voltage level.

Assuming as a starting condition that the automatic voltmeter is resting on the low range, to which it will revert in absence of any test input voltage, the part of low input voltage or lack of input voltage applied to the grids of low-medium switching control tube 54 and medium-high switching control tube 144 is too low to overcome the normal negative bias of these tubes which maintains these tubes substantially at cut off. Under this condition the anode-cathode current in these tubes is negligible and the voltage drop in resistors 62 and 156 is low enough for the gas discharge tubes 66 and 143 to reach a high enough potential and to pass enough current through resistors 68 and 161 respectively to maintain the grids of tubes 76 and 145 somewhat positive with respect to their cathodes by means of the potential across resistors 68 and 161 respectively.

With the grids of tubes 76 and 145 somewhat positive with respect to their cathode their anode-cathode circuits are conducting and their anode current is sufficient for the resistors 81 and 154 to develop a potential drop of 230 volts or slightly more, thus reducing their anode voltages substantially to zero or slightly negative, since their cathodes are connected to −70 volts. Under this condition the anodes of the medium and high range cathode followers 130 and 146 are maintained at substantially zero or slightly negative by means of the connection via wires 139 and 90, junctions 88 and 84, wire 83 and junction 80 between tubes 76 and 130, and by means of the connection via wires 171, junction 170, wires 189, junctions 190 and 168 wire 167 and junction 166 between tubes 145 and 146.

Maintaining the anodes of tubes 130 and 146 at substantially ground or slightly negative potential renders these cathode followers for the medium and high ranges ineffective to serve meter M, and thus in effect disconnects these medium and high range circuits from the meter. Under this condition with wires 139 and 126 at ground potential the range adjusting circuits via tubes 134 and 169 and the range indicator lamps 119 and 189 are also rendered ineffective.

The ground potential on the anodes of the medium and high range cathode followers in the condition just described will be effective via wire 139 and resistor 125 and via wire 70 and resistor 124 respectively to maintain the grid of tube 117 at cut-off bias through potential divider action of resistor 120 and resistors 124 and 125.

Thus the anode-cathode voltage drop of tube 117 will be high and the voltage at the anode at junction 119 will be set by clamping circuit via diode 185 and wires 92 and 93 to +150 volts on the power supply. The anode-cathode potential in this case would approximate 220 volts because of the connection of the cathode to −70 volts via wire 77. The action of the clamping diode is to prevent the anode from rising above 150 volts when the tube is biased substantially to cut-off, and to prevent current flow from the 150 volt terminal through the tube 117 to −70 volts when the tube is substantially conducting Thus with 150 volts positive potential at junction at 187 this potential is applied via wires 112 and 97 to the anode of the low range cathode follower 96, making this low range circuit effective to provide operating current for the meter M. This same 150 volt potential is applied to the low range adjusting circuit via tube 113 and to the low range indicator lamp 118, lighting this lamp to indicate that the automatic voltmeter is on its low range. This range adjusting circuit calibrates the meter for its lowest point on its scale for this range for the characteristics of the cathode follower for this range and to permit recalibration in event of substitution of a replacement cathode follower.

Thus summarizing the normal resting condition of the automatic voltmeter circuit, the low range cathode follower 96 and its associated adjusting circuit and indicator lamp will be effective and the remaining ranges will be ineffective, and the range switching control tubes 54 and 144 will be biased to cut-off.

With a 2 volt input as previously assumed a part of this input voltage will be applied to the grid of the low-medium range switching control tube 54 and will reduce the grid bias. This reduction will not be sufficient to allow enough anode current in tube 54 to cause tube 76 to swing to non-conduction through the gas discharge tube 66 connection to its grid, and therefore the anode potential of tubes 76 and 130 will remain at or below zero and the voltmeter will remain on the low range, the low range indicator lamp will show that a multiplying factor of 1 is to be used for example, giving a direct reading of the scale and the effect of the input-voltage on the meter will be traced under this condition.

Assuming an input of 2 volts again and a net voltage 1.8 volts at the arm 44 of potentiometer 42 this voltage is connected via resistor 94 and wire 95 to the grid of low range cathode follower 96. The anode at approximately 150 volts as previously described will cause cathode current to flow via wire 102, resistor 103, terminal 104 through meter M element to terminal 105 and via 106 to the +2 volt terminal on the power supply. This +2 volt connection provides a potential slightly above ground and this in combination with resistor 107 connected between meter terminal 104 via wire 108 to −3 volts provides a zero indication on the meter when there is no voltage applied to the input.

The 1.8 volts applied to the grid of tube 96 will cause a current through resistor 103 and the meter M such that the meter will read 2 volts on its scale to correspond with the 2 volts test input. With the low range indicator lamp lighted the operator sees that the reading can be taken directly.

The switching of the automatic voltmeter from low to medium range will now be described, and in this connection it will be understood that some degree of overlap is preferably provided between the ranges to permit the meter to provide a steady reading at or near the dividing line values between two ranges without hunting back and forth between the ranges. This is provided by adjusting the grid bias of the switching control tubes and the effect of input voltage on the grid bias so that the input voltage must rise somewhat above 5 volts, say 5.5 volts for example, to cause switching from the low range to the medium range but that when the meter is on the 5 to 50 volt range for example the input voltage must drop to somewhat less than 5 volts say 4.5 volts for example to cause shift to the low range. Similar overlap may be provided for the other ranges.

If it is assumed that the input voltage has changed to over 5.5 volts for example from a lower voltage or that an input volage of over 5.5 volts had just been connected to terminals C and D then a part of this input voltage is applied to the grid at 53 of low-medium range switching control tube 54. With an input voltage of over 5.5 volts the grid bias at 53 is sufficiently reduced to cause substantial anode current. The increased anode current causes a reduction in voltage at the anode at 61 which is passed through the gas discharge tube 66 to the grid of tube 76.

This causes a sufficiently large change in voltage on the grid of tube 76 to cause a large reduction in anode-cathode current so that tube 76 becomes substantially non-conducting. When tube 76 becomes non-conducting its anode voltage rises to about 150 volts at which point it is prevented from rising further by the clamping circuit through diode 87, wires 91, 92 and 93 to +150 volts.

As the anode voltage of tube 76 rises and becomes somewhat positive the stable state of conducting condition is unbalanced and the transfer to the non-conducting condition of tube 76 is accentuated since a portion of the positive shift of anode voltage of tube 76 is transferred to the grid of tube 54 by a regenerative feed-back circuit via junctions 80 and 84, resistor 85, wire 86, junction 56, resistor 55 to the grid of tube 54 at 53, thereby producing a cumulative effect in swinging the grid of tube 54 more positive and the grid of tube 76 more negative until tube 76 becomes non-conducting. Resistor 57 serves in conjunction with resistors 55 and 85 to provide the proper amount of interaction between the anode of tube 76 and the grid of tube 54 to insure only two stable states of conduction and non-conduction of tube 76.

With 150 volts on the anode of tube 76 in its new stable non-conducting condition with over 5.5 volts at the input, this voltage is applied to the anode of the medium range cathode follower tube 130 over the following circuit from anode of tube 76 at junction 80, via wire 83, junction 84, junction 88, wire 90, wire 139 at the anode of tube 130. Sufficient voltage from the +150 volts on wire 139 is also applied to the grid of tube 117 through resistor 125 and junction 122 to junction 121 to cause tube 117 to become fully conducting and thereby reduce its anode potential to or slightly below zero. This removes operating potential from the anode of the low range cathode follower tube 96 connected via wire 112 and renders tube 96 inoperative and also extinguishes the low range indicator light 116. The associated low range zero adjustment circuit through tube 113 is also rendered inoperative by the zero or slightly negative potential on wire 112.

Potential of +150 volts on wire 139 energizes and illuminates the medium range indicator 119 from wire 139 and also connects in the medium range zero adjustment circuit via diode 134.

With the anode operating potential on tube 130 as described and the proper proportion of the input voltage applied to the grid of tube 130 over wire 135, resistor 136 and junction 137 on the potential divider comprising resistors 140, 141, and 142, the cathode current in the tube 130 via wire 73, wire 102 to the meter unit on this medium range is one tenth of the current on the low range and causes the meter to read .55 volt with the medium range times 10 indicator 119 turned on instead of 5.5 volts with the low range times 1 indicator 116 turned on. Thus the operator applies the times 10 factor indicated to the direct scale reading of .55 to obtain 5.5 volts corresponding to the input voltage.

Now as long as the input voltage remains above about 4.5 volts and below about 55 volts the meter remains on the medium or 5 to 50 range. The differential between the 5.5 volts input required to switch from low to medium range and the 4.5 volts input required to switch back from the medium to the low range is provided by the feedback circuit between tubes 76 and 54 via resistors 85 and 55 in relation to resistors 57 and 52.

If the input voltage drops to about 4.5 volts while the meter is on the medium range the grid voltage of tube 54 is shifted sufficiently in the negative direction to unbalance the stable condition of conduction of tube 54 so as to start the toggle action of the circuit through the feedback connection between tubes 54 and 76 to shift tube 54 to non-conducting condition and tube 76 to conducting condition thus returning to their condition for low range operation.

The return of the anode of tube 76 substantially to zero or slightly negative causes cut-off of anode voltage for cathode follower 130 of the medium range, and return to cut-off bias of tube 117, thus returning to 150 volts at the anode of tube 117 and supplying this anode voltage to low range cathode follower 96. This renders the medium range cathode follower and its associated indicator lamp and range adjusting circuit ineffective and renders the low range cathode follower and its associated indicator lamp and range adjusting circuit effective again as previously described for low range operation.

Considering again the meter to be operating on the medium range as previously described, the switching to the high range will now be described, assuming that the circuit is arranged to switch from medium to high range at 55 volts approximately and that the test input voltage changes from 5.5 volts or some other voltage in the middle range to over 55 volts.

In operating on the medium range 5 to 50 the anodes of tubes 76 and 130 have been at 150 volts for operating the medium range cathode follower 130 and the anodes of tubes 117 and 96 for the low range and of tubes 145 and 146 for the high range have been at or somewhat below zero or ground potential, thus cutting off the low and high range. Also on the medium range, as on the low range, the medium-high switching control tube 144 is biased to cut-off.

With a change in input voltage from substantially below to substantially above 55 volts a portion of this increased input voltage appears at arm 50 of potentiometer 49 the latter being connected through resistor 47 and wire 29 to terminal A as previously described. A part of voltage from arm 50 is applied via resistor 147 to the grid of medium high range switching control tube 144 at 148, the high value resistors 147 and 150 serving as a potential divider through the low resistance 153 to ground.

A part of the increased input voltage also appears at the grid of the low-medium switching tube 54, swinging grid voltage further in the positive direction but since this tube is already conducting with tube 76 non-conducting this more positive swing of the grid of tube 54 will maintain tube 54 conducting in the high range as well as in the medium range although as will be described below tube 76 will become conducting in the high range.

The effect of the higher input voltage imparted to the grid of tube 144 however will swing this grid sufficiently in the positive direction to unbalance its stable state of non-conduction with tube 145 conducting and will start the toggle action between these tubes to swing grid of tube 144 more positive to switch tube 144 to a conducting condition and tube 145 to a non-conducting condition. This toggle action is provided by the regenerative feed-back circuit between the anode of tube 145 at junction 166 via wire 167, junction 168, resistor 155, junction 152, wire 151, resistor 150 to the grid of tube 144 at junction 148, in connection with the relatively low resistance 153 connected between junction 152 and ground.

It will be noted that the circuit arrangement of tubes 144 and 145 and the associated gas discharge tube 143 is similar to the circuit arrangement for tubes 54 and 76 with the associated gas discharge tube 66, and thus the interaction of tubes 144 and 145 in switching from medium range to high range condition is similar to the interaction of the tubes 54 and 76 in shifting from low to medium range, with the result that the anode of tube 145 will rise from zero or lower potential to 150 volts approximately as limited by the clamping circuit via diode 186 connected between junction 190 and +150 volts terminal via junction 191 and wire 93.

The 150 volts now appearing at the anode of tube 145 is applied via junction 166, wire 167, junction 168, junction 190, wire 189, junction 170 and wire 171 to the anode of the high range cathode follower 146, placing this cathode follower and its associated range adjusting circuit via tube 169 and its associated indicator lamp 180 into operation in connection with the meter M. This range adjusting circuit and indicator lamp are supplied from the 150 volts now on wire 126 at junctions 176 and 177.

At the same time this 150 volt potential on the anodes of tubes 145 and 146 is applied from junction 170 via junctions 177 and 176 along wire 126 to resistors 124 and 128 connected with the grids of tube 117 and 76 respectively. A sufficient part of this 150 volts will appear at the grids of these tubes to make their anode-cathode circuits conducting. Tube 117 is thus maintained conducting, having already been conducting on the medium range because of the connection between its grid and the 150 volt anode potential on tubes 76 and 130 which has been available on the medium range. However tube 76 has been non-conducting on the medium range and the application of part of the 150 volt anode potential from tubes 145 and 146 to the grid of tube 76 shifts this grid potential in the positive direction to overcome the cut-off bias and make the anode-cathode circuit conducting, thus reducing the potential of the anode at junction 80 to or somewhat below zero. By the connection via wires 90 and 139 this cuts off the anode potential from the medium range cathode follower 130 and its associated range adjusting circuit and range indicating lamp.

The shift has thus been completed from medium to high range and the high range cathode follower 146 is now operative on the meter M as controlled by the portion of the input voltage applied to its grid via wire 183 and resistor 181 from junction 182 on the potential divider provided by resistors 140, 141 and 142, thus controlling the cathode current via wire 172 and resistor 103 and terminal 104 through the meter M circuit to make the meter direct scale reading 0.55 volts for the 55 volts input, but with only the times 100 indicator lamp 180 illuminated, showing that the scale reading is to be multiplied by 100 to obtain a voltage reading of 55 corresponding to the input voltage.

Any reduction in input voltage below approximately 45 volts for example when the meter is on the high range will cause shift to the medium range, the differential of 10 volts between the 55 volt level for shift from medium to high range and the 45 volt level for shift back from high to medium range for example is provided by the feed back circuit previously described between the anode of tube 145 and the grid of tube 144. This shift from high to medium range will be caused by the effect on the grid of tube 144 of the drop in input voltage from above 55 volts to below 45 volts, a part of this voltage drop being applied to this grid from the arm 50 of potentiometer 49, via resistor 147. This input voltage drop swings the grid of tube 144 toward negative, and thus unbalances the stable state of conduction of tube 144 anad non-conduction of tube 145 of high range operation and thereby reversing the toggle action between these tubes and causing tube 144 to be biased to cut-off with tube 144 non-conducting and its high anode potential through discharge tube 143 to the grid of tube 145 causing tube 145 to be conducting. The feed-back previously described between the anode of tube 145 and grid of tube 144 aids this toggle action in connection with resistor 153.

The switching of tubes 144 and 145 to the state of non-conduction of tube 144 and conduction of tube 145 causes the anode voltage of tube 145 to fall to zero or somewhat below and thus by means of the connection via wire 189 causes cutoff of anode voltage from high range cathode follower 146 and its associated range adjusting and range indicating circuits. This anode voltage reduction from about 150 volts on tubes 145 and 146 to zero or somewhat negative affects the grids of tubes 117, 54, and 76, along wire 126 via resistor 128 and junction 67 to grid of tube 76, and along wire 126 via resistor 124 and wire 123 and junction 121 to grid of tube 117.

If it is assume that the input voltage drop was to somewhat below 45 volts but not below 4.5 volts the effect on the grid of tube 117 caused by the consequent anode voltage drop of tubes 145 and 146 is not sufficient to cut-off anodecathode conduction in tube 117 and thus the anode voltage of this tube remains low and anode voltage for the low range cathode follower 96 remains cut-off.

Under the assumed condition of drop in input voltage to somewhat below 45 volts however the effect on the grid of tube 76 of the consequent anode-voltage drop of tubes 145 and 146 is sufficient to swing this grid of tube 76 to cut-off bias and thus shift tube 76 to non-conduction and raise its anode potential to substantially 150 volts as previously described for the condition of non-conduction of tube 76 and conduction of tube 54 now resulting. Thus 150 volt anode operating potential is supplied from the anode of tube 76 to the medium range cathode follower circuit.

Thus the drop in input voltage to somewhat below 45 volts has caused a shift from the high range operation to medium range operation, the high range cathode follower circuit having been switched off and the medium range cathode follower circuit having been switched on, with the low range cathode follower circuit remaining switched off.

However, with the voltmeter on the high range 50-500, if the input voltage were to drop to below 4.5 volts there would be an immediate shift to the low range since this larger reduction in voltage would affect the grid of tube 54 sufficiently to shift it to cut-off as well as to shift tube 144 to cut-off. Thus the low-medium switching control tube 54 and the medium-high switching control tube 144 would both become non-conducting and their associated tubes 76 and 145 would become conducting, cutting off anode voltage from the medium and high range cathode followers. The cutting off of anode voltage from these cathode followers would react on the grid of tube 177 via resistors 125 and 124 as previously described to swing this grid substantially to cut-off bias thus causing tube 117 to become non-conducting, raising its anode voltage to about 150 volts and thereby supplying anode voltage via wire 112 to the low range cathode follower circuit. Thus the entire circuit is restored to its initial low range resting condition for low input voltage or no input voltage.

Rereferring now to Fig. 2 there is shown a preferred type of A. C.-D. C. indicator system which when connected to the terminals C and B will cause one of the indicator lights 223 or 224 to be illuminated respectively for applications of either A. C. or D. C. applied voltage to the test input. The A. C.-D. C. indicator system consists of a high pass filter suitable for blocking out any D. C. on the input terminals C and D comprising capacitor 200 and resistor 209; a high gain amplifier tube 202 connected to said filter so that grid current flows in the positive portions of the applied A. C. and thereby causes substantial reduction in anode current during most of the A. C. cycle; and a pair of gaseous indicator tubes 223 and 224 and control tube 215 so connected that only one of them is illuminated or passes current at a time depending respectively upon whether tube 202 is being operated by A. C. on its grid or is not being operated and thereby having its anode current at a relatively high value.

In detail the A. C. when that is the type of voltage applied to the voltmeter, on the test input C and D is applied to the input of the A. C.-D. C. indicator by direct connection of terminals C on Fig. 1 and C on Fig. 2 and from D on Fig. 1 via wire 12, capacitor 21, wire 22, terminal B' wire 35 to terminal B of Fig. 1 which is connected to terminal B of Fig. 2.

Tube 202 is operated at zero bias and application of A. C. on terminals C and B, from terminal B over wire 211, junction 210, junction 203 to the cathode of tube 202 and from terminal C via capacitor 200, junction 201 to the grid of tube 202, causes grid current to flow on the positive portion of the A. C. wave and thereby charge capacitor 200 to substantially the peak of the A. C. wave.

Resistor 209 connected between junction 201 and junction 210 is chosen of sufficient value to prevent dissipation of any appreciable charge off capacitor 200 during a cycle of the A. C. wave so that the grid of tube 202 has applied to it a voltage varying in accordance with the input A. C. but displaced so that its maximum positive value is zero and at all other times is negative and thereby causes a substantial reduction in the anode current of tube 202. This reduction in anode current which has been flowing from +180 via wire 207, junction 220, wire 206, resistor 205 to junction 204 at the anode of tube 202 causes a marked positive increase in the potential of the anode at junction 204. A portion of this positive increase is transferred to the grid of control tube 215 from junction 204, via resistor 212 to junction 214.

Tube 215, previous to the application of the A. C. to the test input was biased beyond cut-off over the circuit comprising junction 214 at the grid of tube 215, via resistor 213, —70 volts. With no anode current flowing resistor 217 in the anode circuit will have no drop across it and A. C. indicator light 223 will be extinguished since it is in parallel with resistor 217.

Current will flow from D. C. +180 volts via wire 207, junction 220 resistor 218, junction 221, junction 222, via D. C. indicator light 224, via wire 225 to +110 volts, thereby illuminating the D. C. indicator. This indicator is also illuminated if only D. C. is applied to the test input since condenser 200 at the input of the A. C.-D. C. indicator system in conjunction with resistor 209 connected in series thereto absorbs this D. C. potential and prevents any changes in the grid voltage of the amplifier tube 202 and therefore the control tube 215 in whose anode circuit the indicator lights are connected.

Referring now to the condition of A. C. on the input which was shown to cause a positive increase in the potential at the grid of control tube 215 the tube is made conducting thereby. This causes anode current to flow in tube 215 from +180 volts via wire 207, junction 220, resistor 218, junction 221, resistor 217 to junction 216 at the anode of tube 216. Voltage drop across resistor 217 will be sufficient to cause the gaseous A. C. indicator tube 223 in parallel thereto to conduct and be illuminated. The decrease in drop associated with the firing of this tube still further increases the drop at junction 221 such that the voltage from junction 221 via junction 222 via gaseous D. C. indicator 224, via wire 225 to +110 will fall below the extinguish voltage of D. C. indicator 224 and thereby extinguish it.

As the A. C. voltage applied to the meter is reduced to substantially zero tube 202 approaches its fully conducting state, the anode potential of tube 202 falls, more negative grid bias is applied to control tube 215 and the A. C. indicator will be extinguished as the anode current of tube 215 falls below the extinguished current of the A. C. indicator tube 223. This causes a sharp increase in the voltage at junction 221 and thereby places sufficient voltage across D. C. indicator tube 224 to cause it to conduct and be illuminated which is the normal state of the indicators with no voltage, or D. C. voltage applied to the test input.

Fig. 3 shows a modification of the circuit of Fig. 1 which may be provided when it is desired to arrange the automatic voltmeter for the isolation of the D. C. component from the A. C. component from a combination A. C. and D. C. or biased A. C. input.

The circuit in Fig. 3 is connected across test input terminals C and D of the input cathode follower of Fig. 1 and the voltage to be measured is now applied to input terminal C' and D in Fig. 3. The switch arms 301 and 302 are suitably connected together by mechanical linkage indicated by dotted line 300.

The voltage to be measured of terminal C' will be applied to terminal 303 of switch arm 301 to contact 305 via wire 312 to terminal C and grid of tube 28 input cathode follower in Fig. 1. The switch arm 302 is connected to unused terminal 309 by switch terminal 304 via wire 323 to test input terminal D of input cathode follower tube 28, and is not effective in this position.

The above connections permit the voltage to be measured to be placed directly on the grid of input cathode follower tube 28, Fig. 1. The measured voltage may be a steady state D. C. or A. C. or, a combination of both and the resultant reading of meter M Fig. 1 will be the effective value of the applied voltage.

If it is desired to measure only the D. C. component of the biased A. C. the switch arms 301 and 302 are moved down to terminals 306 and 310 respectively to place the voltage to be measured at junction 316 and across the series A. C. filter network, resistor 317 and capacitor 319 via wire 321, terminal 310, switch arm 302, terminal 304 via wire 323 to terminal D of input cathode follower.

The A. C. component of the applied voltage being shunted by capacitor 319 permits the D. C. component to be placed through resistor 317 through junction 318 via wires 314, 312 to terminal C and the grid of tube 28 input cathode follower. The automatic voltmeter will read the value of the D. C. component only.

If it is desired to measure the A. C. component of the D. C. biased A. C. input voltage the switch arms 301 and 302 are moved to the full down position to contacts 307 and 311 respectively. The D. C. biased A. C. input voltage is applied to terminal C'', terminal 303, switch arm 301, contact 307, junction 322, wire 321 across capacitor 319 in series with resistor 317, junction 316 to terminal 311, contact arm 302, terminal 304, via lead 323 to test input terminal D of input cathode follower.

The D. C. component is isolated by capacitor 319. The A. C. component is impressed across resistor 317 through capacitor 319 and applied from junction 318 via lead 314, 312, terminal C to grid of input cathode follower tube 28. The meter M of the automatic voltmeter will read the effective value of the A. C. component of the D. C. biased A. C. input voltage.

In describing the automatic voltmeter and its operation above, a number of examples of values for the several ranges and of voltages for power supply have been stated and in some instances shown on the drawing, and it will be understood that these values and voltages are given for illustration purposes and it is not intended that apparatus according to the invention be limited to such values as it will be obvious to those skilled in the art that considerable variation in the number of ranges and values and degree of overlap in the ranges and in the arrangement of the circuit and values and types of the components of the circuit may be made without departing from the spirit of the invention as defined by the claims.

For the purpose of further illustration but without intending to be limited thereto, the following is a list of circuit values and ranges and component types and values which are suggested for one embodiment of the invention.

Three nominal ranges may be employed for example: .3 to 6 volts for the low range, 3 to 60 for the medium range and 30 to 600 for the high range.

In Fig. 1 the meter M may be a milliameter with 100 ohms resistance and with full scale deflection on 0.7 milliamperes, and the meter scale may be of the logarithmic type marked from .3 to 6 with a suppressed zero. The A. C. power supply may be 110 volts, 60 cycles, feeding through a transformer and rectifier and output voltage divider in the outlined block labeled "Rectifier and D. C. Supply" and providing the output D. C. voltages between +230 and −135 shown in the small blocks alongside the outlined block.

The high voltage winding 11 of the transformer for the input cathode follower may provide an A. C. output voltage of 1000 volts R. M. S. value.

The input cathode follower tubes 16 and 28 may be of a 6SN7 special type having 6SN7 characteristics generally except that their internal construction and base mounting are designated for 600 volt operation along the lines of other well known types of high voltage tubes, where the overall total of the meter ranges extends substantially to 600 volts.

The range cathode follower tubes 96, 130 and 146 and the range switching control tubes 54 and 144 may be of the 6SL7 type. The range switching tubes 117, 76 and 145 may be of the regular 6SN7 type. The clamping diodes 87, 185 and 186 and the range adjusting diodes 113, 134 and 169 may be of the 6H6 type. The range indicator lamps 119, 180, 116 in Fig. 1 and the A. C.-D. C. indicator lamps 223 and 224 of Fig. 2 may be of the 991 type. The gas discharge tubes 66 and 143 may be of the VR150 type.

It will be understood that some of the tubes shown separately in Fig. 1 may be combined in a single envelope as dual tubes.

In the input cathode follower of Fig. 1 the resistances 30 and 34 may be 20 megohms, the resistance 14 may be 100,000 ohms and resistance 15 may be 600,000 ohms. The capacitors 21 and 33 may be .25 mfd. and 1 mfd. respectively.

The resistance 39 may be 25,000 ohms and capacitor 40 may be .25 mfd. The resistance 38 may be 8 megohms and potentiometer 42 may have a total resistance of 2 megohms. The resistor 140 may be 1.8 megohms, and resistors 141 and 142 may be 180,000 ohms and 20,000 ohms, and resistor 103 is 2500 ohms. These four resistors are preferably precision resistors of 1% tolerance or less.

Resistors 94, 136 and 181 may be 10 megohms, 5 megohms and 1 megohm respectively. Variable resistors 111, 133 and 175 may be 1 megohm each, and resistors 109, 132 and 174 may be 1 megohm each. Resistors 115, 131 and 178 may be 2 megohms. Resistor 107 may be 5000 ohms.

Resistor 47 may be 1.8 megohms and adjustable resistor 49 may be 200,000 ohms. Resistors 124 and 125 may be 2 megohms each and resistor 120 may be 500,000 ohms. Resistor 128 may be 5 megohms and resistors 68 and 161 may be 2 megohms each. Resistors 52 and 147 may be 10 megohms each and resistors 55 and 150 may be 20 megohms each. Resistors 57 and 153 may be 200,000 ohms each.

Resistors 85 and 155 may be 10 megohms each, and resistors 81 and 154 may be 40,000 ohms each. Resistors 62 and 156 may be 1 megohm each.

In Fig. 2, resistors 209, 212 and 213 may be 5 megohms each. Resistor 205 may be 1 megohm, resistor 217 may be 500,000 ohms and resistor 218 may be 200,000 ohms. The capacitor 200 may be .002 mfd.

In Fig. 3, resistor 317 may be 1 megohm and capacitor 319 may be 0.1 mfd.

Under some conditions it may be desired to provide automatic range selection in accordance with the invention for an already existing meter or a remotely located meter instead of combining the meter element with the range selective apparatus all in one case for example, and therefor it may be desired to provide in some instances all of the apparatus of Fig. 1, or of Figs. 1 and 2, or of Figs. 1, 2 and 3 except meter M itself in one case, with the terminals 104 and 105 then serving as output terminals for connection of an external meter M.

I claim:

1. In a meter for measurement of electrical values, a measurement indicating element, a plurality of measurement control circuits for said measurement indicating element for different ranges of such electrical values, and an automatic selector for rendering effective an appropriate one of said circuits to operate said measurement indicating element responsive to the range of the electrical value connected to the meter for measurement, an input circuit network for providing a D. C. output having a value corresponding to and in response to a value of D. C. applied to said input circuit network and including means for providing the same D. C. output value for and in response to an R. M. S. value of A. C. applied to said input circuit network corresponding to such value of D. C. applied to said input circuit network, said network having one common pair of input terminals for applied electrical values of A. C. or D. C. and having its output connected to said measuring circuits and to said selector.

2. In a meter for measurement of electrical values, a measurement indicating element, a plurality of measurement control circuits for said measurement indicating element for different ranges of such electrical values, and an automatic selector for rendering effective an appropriate one of said circuits to operate said measurement indicating element responsive to the range of the electrical value connected to the meter for measurement, an A. C.-D. C. indicator means and selective control means for said A. C.-D. C. indicator means to operate the latter in response to electrical input to indicate A. C. and D. C. alternatively responsive to A. C. input and to D. C. input respectively.

3. A meter for measuring electrical values including input terminals, an electric measuring element, a plurality of range circuits for said measuring element each including a cathode follower circuit and providing different ratios of electrical value for said measuring element in relation to an electrical value applied to said input terminals, an electronic switching tube circuit for each range circuit for operatively connecting and disconnecting its associated range circuit to and from said measuring element, an electronic switching control tube circuit connected in toggle switching relation with said switching tube circuits to control such connecting and disconnecting of the latter responsive to a value applied to said input terminals to connect a range circuit having a range of values including such applied value and to disconnect the remainder of said range circuits.

4. An automatic range setting selector apparatus for electrical value measuring instruments including input terminals for connection of an electrical value to be measured, output terminals for connection of an electrical value measuring instrument, three range setting circuits for operative connection between said input and output terminals for applying different ratios of input value at said input terminals to output value at said output terminals to provide different operating ranges of output in relation to input, a range indicator associated with each range setting circuit, and a value responsive selector operatively connected with said input terminals and said range setting circuits to connect operatively only the one of said range setting circuits and its associated indicator corresponding to an electrical value applied to said input terminals said value responsive selector including interlocked electronic switching circuits for connecting the respective range setting circuits and associated indicators one at a time and control circuit means responsive to the applied electrical value to control said electronic switching circuits to connect such corresponding range setting circuit and associated indicator.

5. An electric meter having a plurality of measuring circuits for different ranges of electrical values to be measured including a low range circuit, a medium range circuit and a high range circuit, and an automatic selector for such circuits for selecting between such circuits in accordance with the electrical value to be measured, said selector including an electronic switching circuit comprising grid controlled electronic tube circuits connected in toggle switching relation for controlling the respective range circuits and responsive to an applied electrical value substantially in said medium range to switch from either of the other range circuits to said medium range circuit, and responsive to an applied electrical value substantially in said high range to switch from either of the remaining range circuits to said high range measuring circuit, and responsive to an applied electrical value substantially in the low range to switch from either of the remainder of the other range measuring circuits to the low range measuring circuit, said electronic switching circuit including a switching control circuit biasing said switching circuit for each range to require a change of applied electrical value to substantially outside such range to switch from such range to another of such ranges.

6. In a multi-range voltmeter having a sensitive meter element having a limited operating range and a plurality of operating circuits for said meter element providing different ratios of operating current through said meter element in relation to voltage applied, switching means connected with each of said circuits for operatively connecting and disconnecting said circuits to and from said meter element, selector means responsive to input voltage applied to said voltmeter for operating said switching means to so connect to said meter element one of said operating circuits having a ratio to provide operating current for said meter element within said limited range and proportional to such input voltage and to disconnect the remaining operating circuits, and ratio indicating means associated with each said operating circuit to be operated therewith, zero adjusting means for said meter element associated with each said operating circuit to be operated therewith.

7. A voltmeter including input terminals, an electrical value measuring element, a plurality of cathode follower circuits for said measuring element including means for providing different ratios of electrical value for said measuring element in relation to voltage applied to said input terminals for a plurality of ranges of such applied voltage, and a voltage responsive range selector for operatively connecting one of said cathode follower circuits to said measuring element at a time in accordance with the range of such applied voltage.

8. A voltmeter including input terminals, an electrical value measuring element, a plurality of cathode follower circuits for said measuring element including means for providing different ratios of electrical value for said measuring element in relation to voltage applied to said input terminals for a plurality of ranges of such applied voltage, a voltage responsive range selector for operatively connecting one of said cathode follower circuits to said measuring element at a time in accordance with the range of such applied voltage and an input cathode follower circuit having its output connected to said input terminals and providing for connection of a voltage to be measured at its input.

9. A voltmeter including input terminals, an electrical value measuring element, a plurality of cathode follower circuits for said measuring element including means for providing different ratios of electrical value for said measuring element in relation to voltage applied to said input terminals for a plurality of ranges of such applied voltage, and a voltage responsive range selector for operatively connecting one of said cathode follower circuits to said measuring element at a time in accordance with the range of such applied voltage, a range adjustment circuit and a range indicating circuit for each range cathode follower circuit and connected to be operated by operative connection of its associated range cathode follower circuit.

10. An automatic range setting selector apparatus for electrical value measuring instruments including input terminals for connection of an electrical value to be measured, output terminals for connection of an electrical value measuring instrument, a voltage divider circuit comprising resistors in series across such input and providing taps at desired voltage dividing ratios for providing low, medium and high range ratios for such input, a plurality of cathode follower circuits connected via the respective taps on said voltage divider circuit and connectable to said output, and electronic toggle switching means connected to such input to be controlled by the electrical value to be measured for operatively connecting one of said cathode follower circuits at a time between said voltage divider circuit and said output to select a low, medium or high range ratio of input to output in response to low, medium or high value of input respectively.

11. In an apparatus as in claim 10, a plurality of range adjusting circuits for setting a zero adjustment for said measuring instrument, each of said range adjusting circuits being operatively connected with a separate one of the cathode folower circuits respectively.

12. In an apparatus as in claim 10, said electronic toggle switching means including two electronic toggle switching circuits controlled by said input, one such toggle switching circuit having one normal switching condition for connection of said low range cathode follower circuit only in response to a relatively low level of input and having a second switching condition for disconnecting said low range cathode follower circuit and for potentializing the medium and high range cathode follower circuits for connection by the second toggle switching circuit in response to higher levels of input, said second toggle switching circuit being connected to the input at a higher voltage input ratio than the first and having two switching conditions, one such condition for connecting said medium range cathode follower circuit and the other condition for connecting said high range cathode follower circuit, when potentialized for such connection by the first toggle switching circuit being in its second condition.

13. In apparatus as in claim 10, said electronic toggle switching means including two toggle switching circuits having input control circuits and output control circuits, said input control circuits for the toggle switching circuits being connected to the input of said apparatus at relatively low and relatively high value ratios respectively, the output control circuit of the first toggle switching circuit being connected to said medium range cathode follower circuit to connect the latter and disconnect said low range cathode follower circuit in response to an input level approximating said medium range and for disconnecting said medium range cathode follower circuit and connecting said low range cathode follower circuit in response to an input value below said level, said second toggle switching circuit having its input control circuit connected at a higher input level and having its output control circuit connected to said high range cathode follower circuit for connecting said high range cathode follower circuit and disconnecting said medium and low range cathode follower circuits in response to an input value corresponding with such high range, said toggle switching means including interlocking circuits between said first and second toggle switching circuits for preventing the connection of the medium range cathode follower circuit by said first toggle switching circuit when said second toggle switching circuit is in its second position to connect said high range cathode follower circuit.

14. In a meter for measurement of electrical values, a measurement indicating element, a plurality of measurement control circuits for said measurement indicating element for different ranges of electrical values, and an automatic selector for rendering effective an appropriate one of said circuits to operate said measurement indicating element responsive to the range of the electrical value connected to the meter for measurement, a pair of input terminals for connection of such electrical value to said meter, and a selective filter network for separating A. C. and D. C. components of a combined A. C. and D. C. electrical input, said selective network having an input for connection of the electrical value to be measured to said network and an output connected to said input terminals of said meter and including a resistor, a capacitor and selector switching means having one position for connecting said capacitor across said input terminals and for connecting said resistor in series between one of said terminals and said network input to apply the D. C. component only to said input terminals of said meter, said switching means having another position for connecting said resistor across said input terminals and for connecting said capacitor in series between one of said input terminals and said network input to apply only such A. C. component to said input terminals of said meter.

15. Apparatus as in claim 3, and including a pair of input terminals for connection of such electrical value to said meter, a selective filter network having an input for connection of the electrical value to be measured to said network and an output connected to said input terminals of said meter, said network including a resistor, a capacitor and selective switching means having two switching conditions, one such condition including means for connecting said capacitor across said input terminals and for connecting said resistor in series with one of said input terminals to by-pass any A. C. component and apply any D. C. component in the electrical value to be measured to said input terminals, and the second such condition including means for connecting said resistor across said input terminals and for connecting said capacitor in series with one of said input terminals to by-pass any D. C. component and apply any A. C. component in the electrical value to be measured to said input terminals.

16. In a meter for measurement of electrical values, a measurement indicating element, a plurality of measurement control circuits for said measurement indicating element for different ranges of electrical values, and an automatic selector for rendering effective an appropriate one of said circuits to operate said measurement indicating element responsive to the range of the electrical value connected to the meter for measurement, an input circuit network for said meter for connecting the electrical value to be measured to the meter input, said input circuit network including test input terminals, a cathode follower circuit having its control grid connected to one of said test input terminals and a high resistance connecting its cathode to the other of such test input terminals, a triode rectifier, a circuit including another high resistance connecting the grid of said triode rectifier to the cathode circuit of the last mentioned cathode follower, a circuit including a resistance and a parallel capacitance connecting the cathode of said triode rectifier to said other test input terminal, a direct connection between the cathode of said triode rectifier and the anode of said last named cathode follower, an A. C. supply circuit connected between the anode of said triode rectifier and said other test input terminal, a connection from a tap on said last named resistance to one side of the said meter input, a capacitor connected between the last named connection and said other test terminal, a connection between the cathode of said cathode follower and the other side of said meter input, and a series resistor-capacitor circuit in shunt with said meter input.

17. A meter as in claim 16 and including indicator means and selective control means for operating said indicator means in response to electrical input to indicate A. C. and D. C. respectively for and in response to A. C. and D. C. input at said test input terminals.

18. In a meter for measurement of electrical values, a measurement indicating element, a plurality of measurement control circuit for said measurement indicating element for different ranges of electrical values, and an automatic selector for rendering effective an appropriate one of said circuits to operate said measurement indicating element responsive to the range of the electrical value connected to the meter for measurement, an input circuit network for connecting the electrical value to be measured to the input of the meter, said input circuit network including test input terminals, a cathode follower circuit having its input connected across said test input terminals, an AC supply circuit, a grid controlled rectifier circuit for deriving a controlled DC supply for said cathode follower circuit from said AC supply circuit, a high resistance connected between the control grid of said rectifier circuit and the cathode circuit of said cathode follower circuit to control such DC supply, a circuit for applying the output of said cathode follower circuit to said meter input, and a series resistance-capacity circuit connected across such meter input to provide at such meter input a controlled DC corresponding to the electrical value to be measured to such test input terminals.

JOHN L. BARKER.

(References on following page)

REFERENCES CITED

The following references are of record in the file of this patent:

UNITED STATES PATENTS

| Number | Name | Date |
|---|---|---|
| 536,478 | Parker | May 26, 1895 |
| 1,784,522 | Harrison | Dec. 9, 1930 |
| 1,811,319 | Johnson | June 23, 1931 |
| 1,959,592 | Macadie | May 22, 1934 |
| 2,400,190 | Clark | May 14, 1946 |
| 2,434,297 | Test et al. | Jan. 13, 1948 |
| 2,457,214 | Doll et al. | Dec. 28, 1948 |

FOREIGN PATENTS

| Number | Country | Date |
|---|---|---|
| 406,360 | Great Britain | Feb. 26, 1934 |

OTHER REFERENCES

Publication "Vacuum Tube Voltmeter," by Rider, pages 51 through 55; copyright 1941 by John Rider; John F. Rider Publishing Co., New York City 16, N. Y. (Copy in Patent Office Library TK; 321; .R5 Cop. 2.)